United States Patent [19]
DeFrancesco et al.

[11] Patent Number: 5,952,579
[45] Date of Patent: Sep. 14, 1999

[54] ULTRA-HIGH PURITY BOURDON TUBE PRESSURE GAUGE SYSTEM

[75] Inventors: David C. DeFrancesco, Branford; Brian T. Donahue, Waterbury; Louis A. Rosen, Huntington; John A. Turbeville, Stratford; Louis F. Bregy, Weston, all of Conn.

[73] Assignee: Dresser Industries, Dallas, Tex.

[21] Appl. No.: 09/022,731

[22] Filed: Feb. 12, 1998

[51] Int. Cl.⁶ ........................................................ G01L 7/04
[52] U.S. Cl. .................................................. 73/743; 73/741
[58] Field of Search ........................................ 73/732–743

[56] References Cited

U.S. PATENT DOCUMENTS

| 18,129 | 9/1857 | Ashcroft | 73/741 |
| 1,537,338 | 5/1925 | Deverall | 73/741 |
| 5,591,918 | 1/1997 | Ferguson | 73/732 |

*Primary Examiner*—Joseph L. Felber
*Attorney, Agent, or Firm*—Haynes and Boone, L.L.P.

[57] ABSTRACT

A reduced volume socket body and a reduced volume tube are used in a pressure gauge system in semi-conductor fabrication process equipment. The socket body includes an outlet and the tube has an end connected to the outlet. The outlet is a shaped, weld prep formed on the socket body having an inner surface. A continuous seat is formed on the outlet and includes a seat thickness. The tube has an inner wall and an outer wall defining a wall thickness which is substantially the same as the seat thickness. The end of the tube is engaged with the seat so that the inner wall of the tube and the inner surface of the outlet are substantially aligned to form a crevice free tube-to-socket connection.

15 Claims, 3 Drawing Sheets

ULTRA-HIGH PURITY BOURDON TUBE PRESSURE GAUGE SYSTEM

BACKGROUND

The disclosures herein relate generally to pressure gauges and more particularly to such gauges used in semi-conductor fabrication process equipment.

A typical Bourdon tube pressure gauge system includes a socket body connected to adapt a Bourdon tube to a process connection. The tube is exposed to a pressurized gas supply measured by a gauge, or a compound gauge which indicates pressure and/or a vacuum present in the Bourdon tube. A cap on a distal end of the tube connects to a mechanical linkage. The tube flexes under pressure and the cap moves to actuate the linkage which drives a pointer indicating an analog reading. The reading is in pounds per square inch of positive pressure or in inches of Mercury (Hg) of vacuum pressure.

In semi-conductor fabrication processes, pressure gauges are used to monitor gas pressure in ultra high purity gas distribution systems. In a typical semi-conductor fabrication process, more than 250 gases are used to manufacture semi-conductor devices. Gas sources include bottles, cylinders, or bulk gas supplies. Before a gas source can be connected to an ultra high purity gas distribution system, the gas system must be purged from impurities and moisture. This purging process is known as dry down. The factors that affect dry down time are internal volume and surface finish of the gas system including piping, fittings, components, etc. Dry down can be very time consuming, often several days.

Also, in semi-conductor fabrication processes, pressure gauges are used to monitor gas pressure in ultra high purity gas distributions systems. However, a typical semi-conductor fabrication process uses a variety of chemically corrosive gases to manufacture semi-conductor devices. When corrosive gases are trapped in crevices, microscopic corrosion occurs generating particulate. Particulate in turn can flow through the gas system into the semi-conductor device which in turn destroys the semi-conductor reducing process yield. Therefore, the goal of an ultra high purity gas distribution system is to include components that are free from crevices, and other surface imperfections that create particle generation sites.

Therefore, what is needed is an apparatus and a method which provides a pressure gauge system with minimal internal volume, an internal surface finish that does not sacrifice functional performance, and a crevice free connection between the tube and the socket body to reduce particulate generation when exposed to chemically corrosive gases used in semi-conductor high purity gas distribution systems.

SUMMARY

One embodiment, accordingly, provides a reduced internal volume pressure gauge system including a smooth internal finish and crevice free tube-to-socket connection. To this end, a pressure gauge device includes a socket body having an outlet and a tube having an end connected to the outlet. The outlet is a shaped, weld prep outlet formed on the socket body and includes an inner surface. A continuous seat is formed on the outlet and includes a seat thickness. The tube has an inner wall and an outer wall defining a wall thickness which is substantially the same as the seat thickness. The end of the tube is engaged with the seat so that the inner wall of the tube and the inner surface of the outlet are substantially aligned to form a crevice free tube-to-socket connection.

In another embodiment, a pressure gauge device includes a socket body having an inlet, an outlet and an internal passageway interconnecting the inlet and the outlet. A Bourdon tube has a first end connected to the outlet and a second end of the tube has a cap mounted thereon. The outlet is a shaped, weld prep formed on and protruding from the socket body. The outlet has an inner surface. A continuous shoulder is formed on the inner surface. The shoulder has a shoulder thickness. The tube has an inner wall and outer wall defining a wall thickness. The wall thickness is substantially the same as the shoulder thickness. The first end of the tube is engaged with the shoulder so that the inner wall of the tube and the inner surface of the outlet are substantially aligned to form a crevice free tube-to-socket connection.

A further embodiment provides a method of forming a crevice free tube-to-socket connection and includes the steps of shaping a seat on the outlet so that the seat has a seat thickness; shaping an end of a tube to matingly engage with the seat, the tube having an inner wall and an outer wall defining a wall thickness which is substantially the same as the seat thickness; and engaging the end of the tube with the seat so that the inner wall of the tube and the inner surface of the outlet are substantially aligned.

A principal advantage of this embodiment is the reduced internal volume of the pressure gauge system which reduces dry down and purge time. In addition, the crevice free connection between the tube and socket body reduces particulate generation when exposed to chemically corrosive gases found in semi-conductor ultra high purity gas distribution systems.

DETAILED DESCRIPTION OF THE PREFERRED EMBODIMENT

Figure 1:
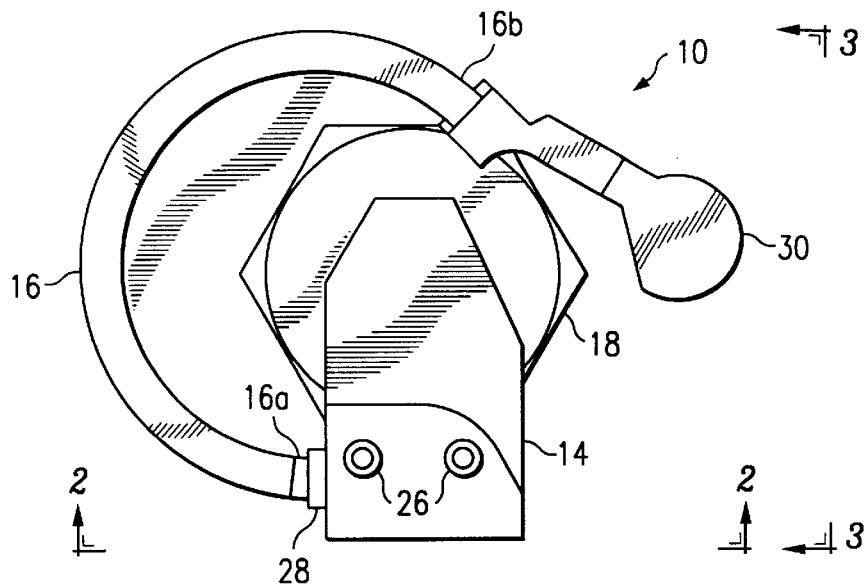
FIG. 1 is an end view illustrating an embodiment of a pressure gauge device.
Figure 2:
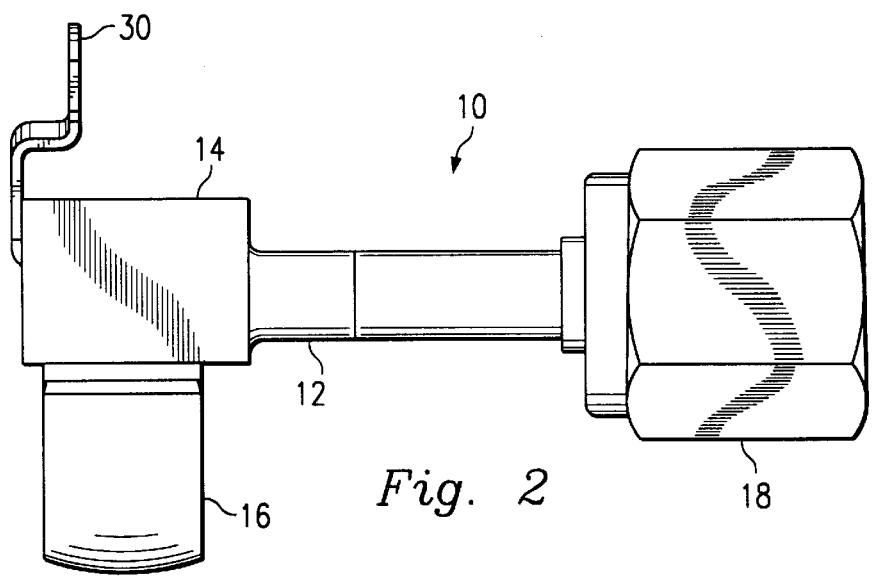
FIG. 2 is a bottom view of the pressure gauge device taken along the line 2—2 of FIG. 1.
Figure 3:
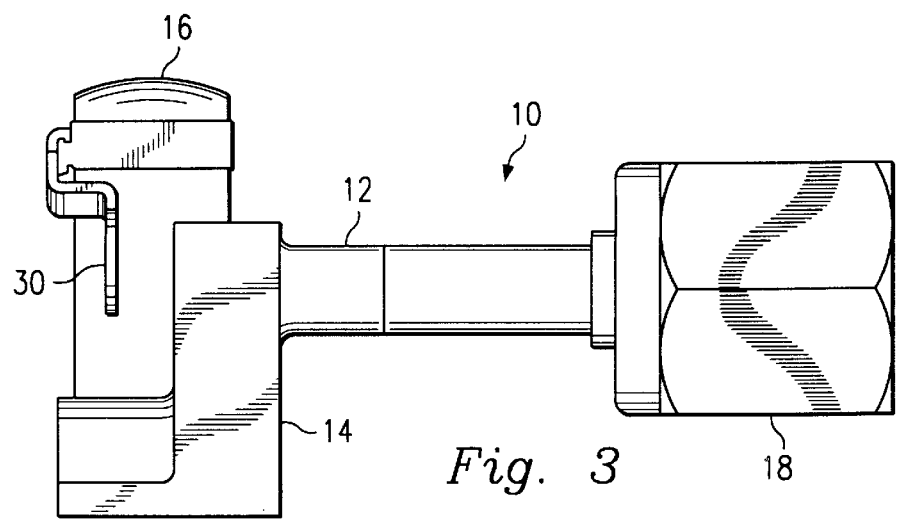
FIG. 3 is a side view of the pressure gauge device taken along the line 3—3 of FIG. 1.

A pressure gauge device 10 is illustrated at FIGS. 1–3 and includes a process connection 12, a socket body 14 and a Bourdon tube 16. The process connection 12 leads to a fitting 18, which mates with a complimentary fitting (not shown), which in turn connects to a pipe which carries a gas supply (also not shown). The gas is a corrosive, aggressive gas supply used in the semi-conductor industry, e.g. hydrogen chloride or hydrogen fluoride gas. The gas is a high-purity gas used for etching in producing semi-conductors in a clean room environment.

Figure 4:
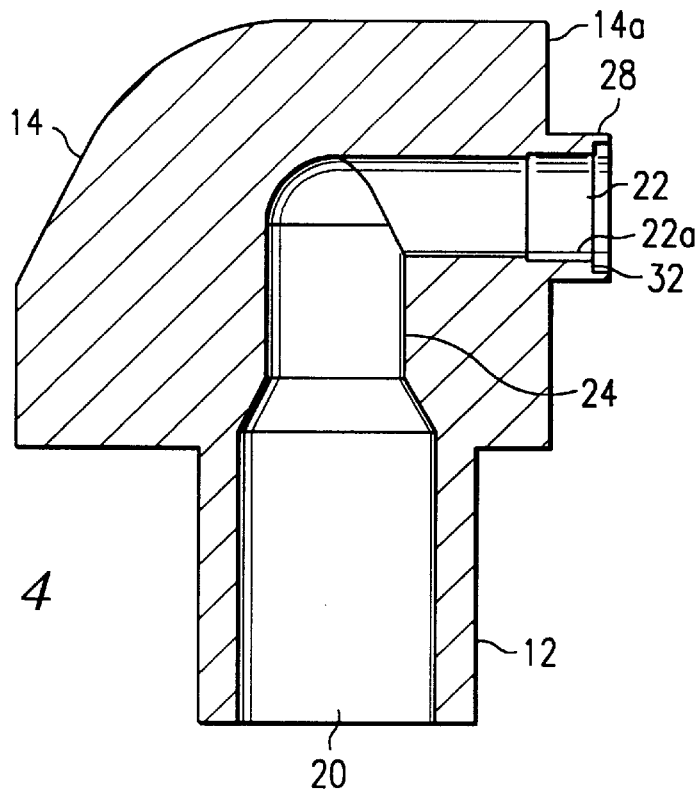
FIG. 4 is a cross-sectional side view illustrating an embodiment of the socket body.
Figure 5:
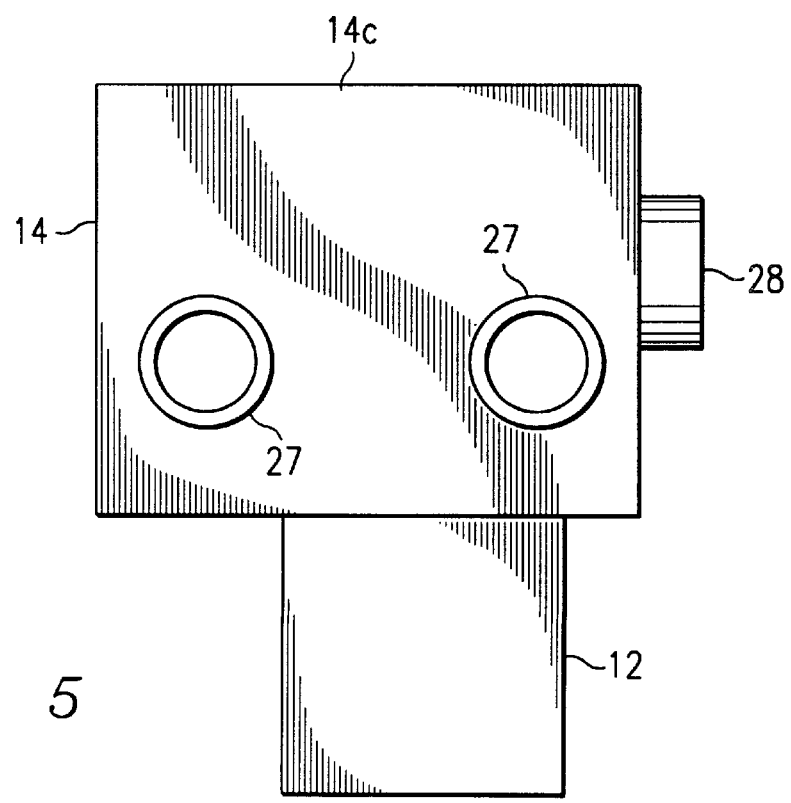
FIG. 5 is a side view illustrating an embodiment of the socket body.
Figure 6:
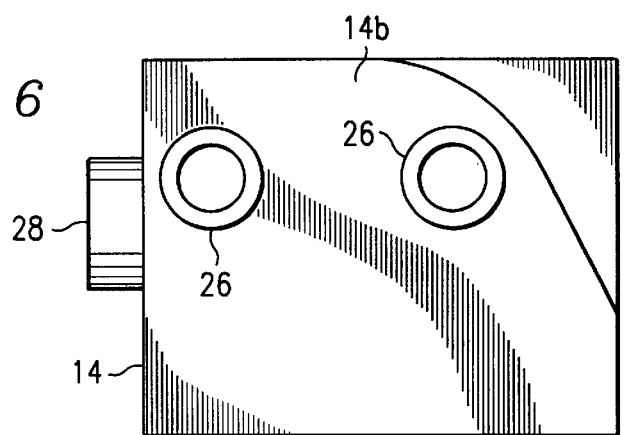
FIG. 6 is an opposite side view of the socket body of FIG. 5.

The socket body 14, FIG. 4, is a machined stainless steel part including an inlet 20, formed in the process connection 12 for receiving the gas, an outlet 22 formed in a surface 14a, and an internal passageway 24, inside body 14, which interconnects inlet 20 and outlet 22. A pair of blind threaded bores 26, FIG. 6, formed in a surface 14b, are provided for attaching a pressure and/or vacuum indicator dial and movement (not shown) directly onto the socket body 14. The socket body 14 adapts the Bourdon tube 16, FIG. 2, to the process connection 12. The purpose of the gauge is to read the positive pressure and/or vacuum pressure present in the Bourdon tube 16. A second pair of blind threaded bores 27, FIG. 5, formed in a surface 14c, are provided for mounting the device 10 onto a stainless steel case (not shown) which is an enclosure for housing the device. The enclosure includes a see-through glass window for reading the gauge.

Socket body 14, FIG. 1, includes a weld prep 28 at the outlet 22 for connection to a first end 16a of the Bourdon tube 16. A cap 30 is attached by welding to a distal end 16b of the Bourdon tube 16. Cap 30 functions in the well known manner, (not illustrated) as a connection to a mechanical linkage and through a gear set to drive a pointer when tube 16 flexes under pressure. The resulting movement indicates an analog reading on a dial face to show pounds per square inch of positive pressure in tube 16 or to show inches of Hg vacuum pressure in tube 16.

Figure 7:
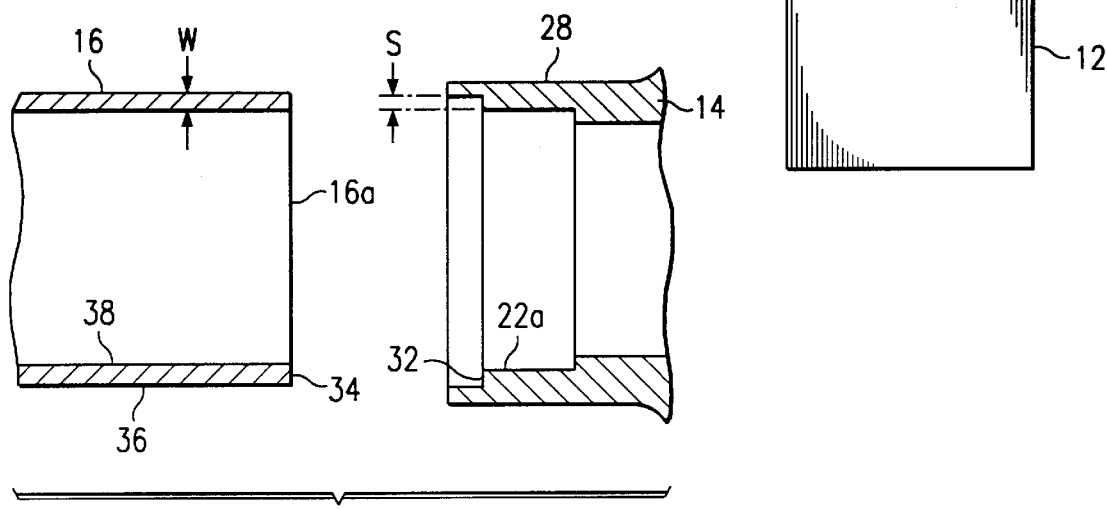
FIG. 7 is a diagrammatic view illustrating an embodiment of the mating fit of the tube and the weld prep.
Figure 8:
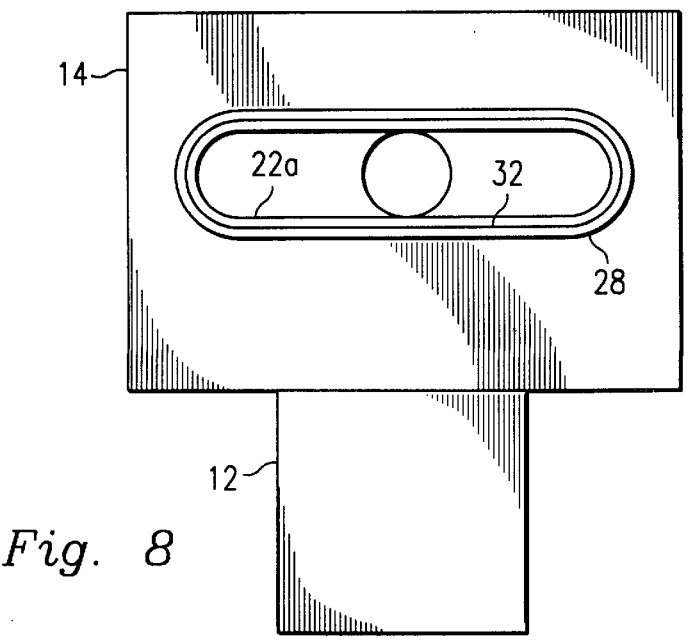
FIG. 8 is a frontal view of the socket body taken along the line 8—8 of FIG. 6.

Weld prep 28, FIGS. 4, 7 and 8, is machined on socket body 14 to form a seat 32 for receiving first end 16a of tube 16. Seat 32 FIG. 8, is formed as a continuous oblong oval shaped shoulder on an inner surface 22a of weld prep 28, having a shoulder thickness designated S, FIG. 7.

Bourdon tube 16 is commercially available in various sizes and has an oblong cross-section with substantially pointed sides. In order to reshape the end 16a for a mating fit with seat 32, a pair of spaced apart pins are urged into end 16a of tube 16 15 to reshape the pointed sides. The end 16a is then crimped around an oval fixture until the original oblong pointed shape is transformed into a substantially oval oblong shape which mates with seat 32 of weld prep 28.

Tube 16, FIG. 7, has a wall 34 including an outer surface 36 and an inner surface 38 defining a wall thickness designated W which is substantially the same as the shoulder thickness designated S. In this manner, when end 16a of tube 16 is seated on seat 32, inner surface 22a of weld prep 28 and inner surface 38 of tube 16 are substantially aligned to form a crevice free, tube-to-socket connection. The finished tube dimensions which mate with seat 32 are about 0.440 inches by 0.112 inches.

The volume of the device 10 is substantially reduced over previous devices. The total internal gas volume of the tube 16 and socket body passageway 24 is about 1–1.25 cubic centimeters. This volume reduction substantially reduces dry down time. This is accomplished by forming the passageway 24, FIG. 4, in socket body 14 with inlet 20 having a bore diameter of about 0.180 inches interconnected with outlet 22 having a bore diameter of about 0.082 inches. The bore diameters are formed by appropriately sized reamers. A finish is then applied to the inlet and outlet bores by a mechanical polishing step comprising a slurry hone process. The process involves the use of silicon carbide media reciprocally moved within the bores under high pressure and high temperature, to remove the circular machining marks and to provide flow lines in the bore surfaces which run in the direction of the honing media. In this manner a 10 RA profilometer finish is accomplished on the bore surfaces. The socket body 14 is then welded to the fitting 18.

End 16a, FIG. 7, of tube 16 is welded to weld prep 28 so that end 16a engages seat 32. However, prior to welding tube 16 to socket body 14, the tube 16 is aggressively cleaned by a passivation process. First, the tube 16 is treated in an alkaline cleaner to remove oils and grease. Next, tube 16 is treated in a nitric hydrofluoric acid both to remove any oxidation on surfaces of tube 16. This allows a clean weld connection between tube 16 and socket body 14.

The process of welding process connection 12 to socket body 14 is accomplished by the use of an ultra-high purity gas, e.g. high purity Argon. The process connection 12 to socket body 14 assembly is subjected to the alkaline cleaner to remove oil and grease. The assembly is then treated in another nitric hydrofluoric acid bath to remove oxidation from all surfaces. An electropolishing step is then accomplished which electropolishes surfaces of the device inside and out with the exception of the inner surface 38 of tube 16. This process includes a mixture of phosphoric and sulfuric acids in a bath with a current applied.

A further passivation step in the nitric acid enhances corrosion resistance to the surfaces of the device 10 and forms a chrome oxide layer so that iron oxide does not form. The device is taken into a clean room environment and bathed in ultra-pure deionized water, then dried in a vacuum back environment to remove all moisture. Finally cap 30 is welded onto end 16b of tube 16 in an oxygen and moisture free environment and the final assembly is calibrated in the clean room. Peripheral connections including the movement pointer, case, window and gauge are finalized and the device is packaged in a bag filled with pure $N_2$ and enclosed in a second bag before shipping.

The result is a crevice free tube-to socket connection of reduced volume, which reduces dry down and purge time. The crevice free connection between the tube and socket body at the shoulder formed in the weld prep, reduces particulate generation when the device is exposed to the chemically corrosive gasses used in semi-conductor ultra-high purity gas distribution systems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A pressure gauge device comprising:
    a socket body including an outlet;
    a Bourdon tube having an end connected to the outlet;
    the outlet being a shaped, weld prep formed on and extending from the socket body, the outlet having an inner surface;
    a recessed seat formed in the outlet, the seat having a seat thickness;
    the Bourdon tube having an inner wall and an outer wall defining a wall thickness, the wall thickness being substantially the same as the seat thickness; and
    the end of the Bourdon tube being inserted into the outlet and engaged with the seat so that the inner wall of the Bourdon tube and the inner surface of the outlet are substantially aligned to form a crevice free tube-to-socket connection.

2. The device as defined in claim 1 wherein the seat includes a shoulder.

3. The device as defined in claim 2 wherein the shoulder is formed on the inner surface of the outlet.

4. The device as defined in claim 2 wherein the shoulder is oblong.

5. The device as defined in claim 1 wherein the Bourdon tube is flexible.

6. The device as defined in claim 5 wherein the Bourdon tube has another end including a cap mounted thereon.

7. The device as defined in claim 1 wherein the socket body includes an inlet.

8. The device as defined in claim 7 wherein the inlet and the outlet are interconnected by a passageway formed in the socket body.

9. The device as defined in claim 1 wherein the Bourdon tube end is fixedly attached to the socket body by a weld at the seat.

10. A pressure gauge device comprising:

a socket body including an inlet, an outlet and an internal passageway interconnecting the inlet and the outlet;

a Bourdon tube having a first end connected to the outlet and a second end having a cap mounted thereon;

the outlet being a shaped, weld prep formed on and protruding from the socket body, the outlet having an inner surface;

a recessed shoulder formed in the inner surface, the shoulder having a shoulder thickness;

the Bourdon tube having an inner wall and an outer wall defining a wall thickness, the wall thickness being substantially the same as the shoulder thickness; and the first end of the Bourdon tube engaged with the shoulder so that the inner wall of the tube and the inner surface of the outlet are substantially aligned to form a crevice free tube-to-socket connection.

11. The device as defined in claim 10 wherein the Bourdon tube is flexible.

12. The device as defined in claim 11 wherein the Bourdon tube is fixedly attached to the socket body by a weld between the shoulder and the first end of the Bourdon tube.

13. The device as defined in claim 10 wherein the internal passageway of the socket body is mechanically polished by abrasive flow honing and is electropolished by a phosphoric and sulfuric acid mixture.

14. The device as defined in claim 10 wherein the Bourdon tube and the socket body are passivated in nitric hydrofluoric acid.

15. The device as defined in claim 10 wherein the internal volume of the Bourdon tube and the internal passageway of the socket body is less than 1.25 cubic centimeters.

* * * * *